United States Patent [19]

Mathur

[11] Patent Number: 6,061,744

[45] Date of Patent: May 9, 2000

[54] GENEROUS TIT-FOR-TAT COOPERATIVE DISTRIBUTED COMPUTING

[75] Inventor: Atul K. Mathur, Tualatin, Oreg.

[73] Assignee: Autodesk, Inc., San Rafael, Calif.

[21] Appl. No.: 09/076,568

[22] Filed: May 12, 1998

[51] Int. Cl.[7] .................................................. G06F 13/00
[52] U.S. Cl. ............................................................ 709/304
[58] Field of Search ..................................... 709/100, 104, 709/105, 107, 200, 201, 300, 302, 304

[56] References Cited

U.S. PATENT DOCUMENTS 5,787,251 7/1998 Graham et al. .......................... 709/203

*Primary Examiner*—Robert B. Harrell
*Attorney, Agent, or Firm*—Blakely Sokoloff Taylor & Zafman, LLP

[57] ABSTRACT

A distributed computing method is disclosed. The method includes a requester making a number of requests to a number of other computers to perform a number of operations for the requestor's computer using the other computers' resources. The method further includes each corresponding grantor of the other computers to determine whether the other computer should grant the request(s). Each grantor is to make the determination at least at times in accordance with the requestor's computer's prior response(s) to the grantor's computer's prior request(s) of the requestor's computer to perform one or more operations for the grantor's computer. In one embodiment, the method further includes the grantor making the determination in accordance with whether a generosity measure denotes the requestor's computer's request should nevertheless be granted notwithstanding the requestor's computer's prior response(s) to the grantor's computer's prior request(s) suggesting that the requestor's computer's request should not be granted. In one embodiment, the requestor and grantor are embodied in a computer system.

34 Claims, 5 Drawing Sheets

GENEROUS TIT-FOR-TAT COOPERATIVE DISTRIBUTED COMPUTING

BACKGROUND OF THE INVENTION

1. Field of the Invention

The present invention relates to the field of computer systems. More specifically, the present invention relates to distributed computing among workstations.

2. Background Information

Distributed computing, i.e. having a set of independent tasks to be performed by multiple computer systems in parallel, has been of interest for sometime now to the artesian of the computer art; especially in the last few years where increasingly more powerful networkable workstations and networking equipment are being produced by computer and networking equipment manufacturers as a result of advances in microprocessor and networking technology. However, despite these recent advances, distributed computing using powerful networked workstations had failed to achieve its full potential. The greatest success has remained limited only to the harnessing of their resources to solve a large complex problem, such as fluid dynamic problems, when the networked workstations are not in use during the over night period. The greatest hurdles in preventing distributed computing using powerful networked workstations from being more successfully deployed during regular business hours are the human nature of not willing to share the machine resources of his/her workstation for fear of being adversely impacted, and the lack of support by the workstation operating systems in preventing a user from lowering the priority of guest overloads "forced" onto a workstation. As a result, very often, businesses are forced to equip many users with very powerful workstations, such that there will be sufficient computing power to meet the individual users peak computing demand, and yet these very powerful workstations are generally under utilized most of the times. Thus, a solution that can overcome at least the described hurdles, and enable distributed computing using powerful networked workstations to be more widely accepted, in particular, during periods, such as normal business hours, where the powerful networked workstations are used by the assigned users is desired. As will be readily apparent to those skilled in the art, from the detailed descriptions to follow, the present invention achieves these and other desirable results.

SUMMARY OF THE INVENTION

A distributed computing method is disclosed. The method includes a requester making a number of requests to a number of other computers to perform a number of operations for the requestor's computer using the other computers' resources. The method further includes each corresponding grantor of the other computers to determine whether the other computer should grant the request(s). Each grantor is to make the determination at least at times in accordance with the requestor's computer's prior response(s) to the grantor's computer's prior request(s) of the requestor's computer to perform one or more operations for the grantor's computer. In one embodiment, the method further includes the grantor making the determination in accordance with whether a generosity measure denotes the requestor's computer's request should nevertheless be granted notwithstanding the requestor's computer's prior response(s) to the grantor's computer's prior request(s) suggesting that the requestor's computer's request should not be granted.

In one embodiment, the operations are solid modeling operations of a computer-aided design (CAD) application. The requestor and grantor are implemented in software, and incorporated as an components of the (CAD) application. The CAD application, including the requester and grantor is embodied in a distribution storage medium for use to install the CAD application, including the requestor and grantor, on a number of networked computer systems.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as messages, data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system include general purpose as well as special purpose data processing machines, systems, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

Figure 1:
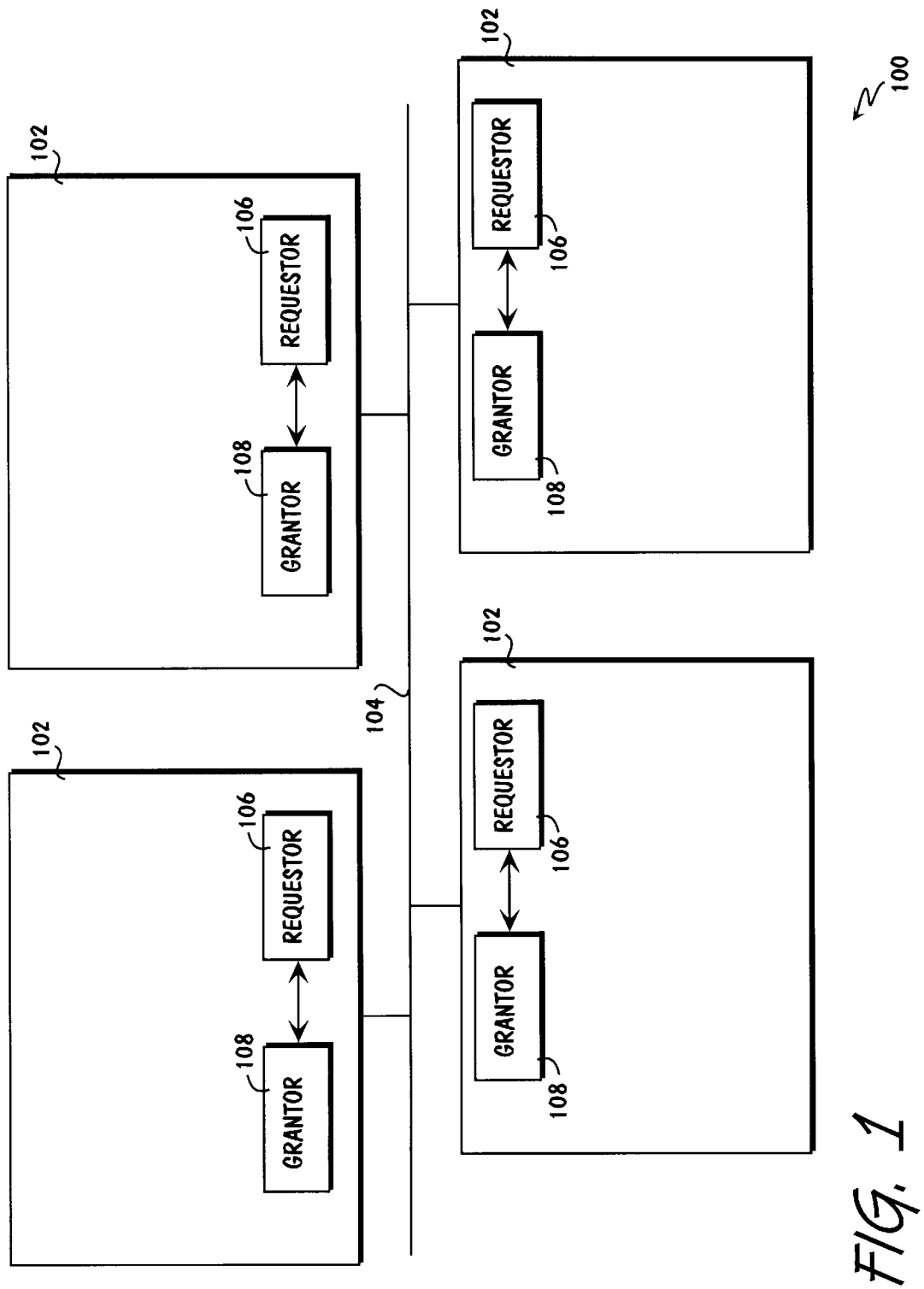
FIG. 1 is a block diagram illustrating a network of workstations incorporated with the teachings of the present invention.

Referring now FIG. 1, wherein a block diagram illustrating a network of workstations 100 incorporated with the teachings of the present invention is shown. As illustrated, network of workstations 100 include a number of workstations 102 interconnected to each other through network 104. In accordance with the present invention, each workstation 102 is equipped with requestor 106 and grantor 108 of the present invention to enable each workstation 102 to participate in effectuating distributing computing among the workstations 102. More specifically, requesters 106 and grantors 108 of the various workstations 102 cooperate with one another to facilitate the granting of the resources of one workstation 102 for use to perform one or more operations for one or more of the other workstations 102. In particular, each grantor 108 employs a novel "generous tit-for-tat" approach in determining whether to grant a requestor's request, to be described more fully below.

Except for requestor 106 and grantor 108 of the present invention, workstation 102 and network 104 are intended to represent a broad category of these elements known in the art. An exemplary embodiment of a workstation suitable for practicing the present invention will be described later with references to FIG. 5 after the present invention has been described. With respect to network 104, it may be a local area network, such as an Ethernet or a Token Ring network, or it may be a wide area network, such as an ATM or a Frame Relay network. In addition to the cabling, there may be any number of hubs, routers, switches and other networking equipment necessary to form the network. The networking protocol may be any one of a number of protocols known in art, including but not limited to TCP/IP, Appletalk, IPX and so forth. In a TCP/IP embodiment, the workstations are identified by their IP addresses.

Each requester 106 is used to request other workstations to perform a number of operations for the requestor's workstation using the other workstations' resources. such as the other workstations processor, memory, disk space and so forth. In one embodiment, the requests, including the resource requirements, are broadcast/multicast to the requested workstations, using e.g. the user datagram protocol (UDP). In alternate embodiments, other protocols may be employed. Upon broadcasting/multicasting the requests, requester 106 then listens for responses from grantors 108. In the UDP embodiment, requester 104 listens on a predefined UDP port. In one embodiment, each requestor 106 also maintains the other workstations' responses to its requests, i.e. whether its requests are granted or not. Each grantor 108 is used to determine for the grantor's workstation whether a request from another workstation to perform an operation for the requesting workstation using the grantor's workstation's resources should be granted or not. Each grantor 108 makes the determination at least at times in accordance with whether the requestor's workstation's prior response(s) to the grantor's workstation's prior request(s). In one embodiment, each grantor 108 further makes the determination in accordance with whether a generosity measure denotes the requestor's workstation's request should nevertheless be granted notwithstanding the requestor's workstation's prior response(s) to the grantor's workstation's prior request(s) suggesting that the requestor's workstation's request should not be granted. In the above described embodiments where each requestor 106 broadcast/multicast its requests, each grantor 108 listens for request packets continuously, e.g. at a predefined UDP port. Each grantor 108 informs requesters 106 of its determination using a protocol of like kind, e.g. unicasting the requestors with UDP messages at predefined UDP ports.

Figure 2:
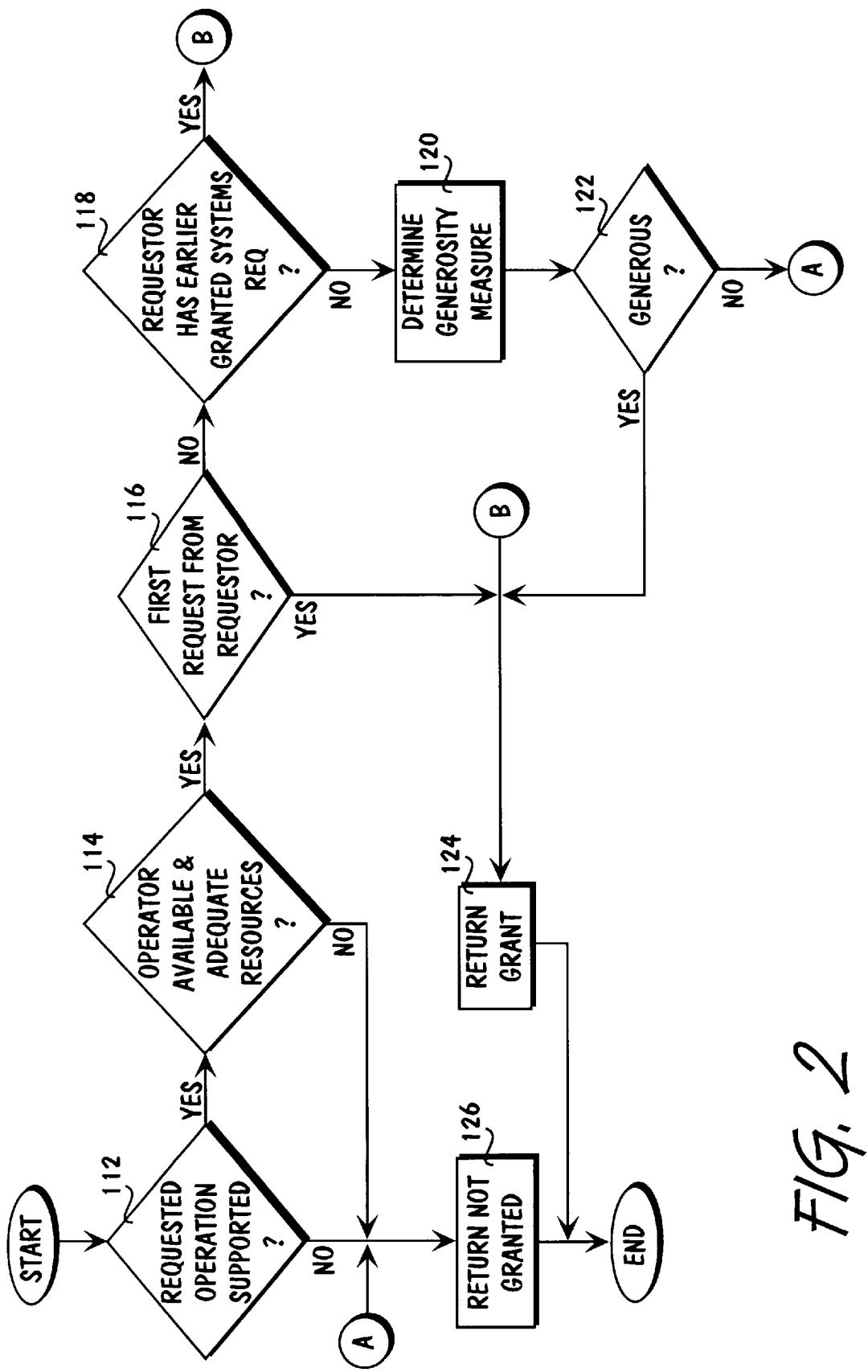
FIG. 2 is a flow diagram illustrating one embodiment of the method steps of the present invention.

The operational flow of both requestor 106 and grantor 108 will be jointly described with references to FIG. 2, which illustrates the method steps of the present invention. From the descriptions to follow, those skilled in the art will appreciate that both requestor 106 and grantor 108 may be implemented in either software, e.g. using the C programming language, or in hardware, e.g. using a programmable logic device.

Referring now to FIG. 2, to effectuate distributed computing among the workstations, as described earlier, a requester of a workstation having a number of tasks/operations that can be distributed to the other workstations requests the other workstations to perform the tasks/operations (step not shown). As illustrated, a grantor receiving a request first determines whether the requested task/operation is supported by the workstation, step 112. If the requested task/operation is not supported, the grantor returns a "not granted" or "failed" message to the requester, step 126. On the other hand, if the requested task/operation is supported, the grantor determines whether the service agent or operator that supports the task/operation is available, i.e. free to perform the service/operation, and that the resources required to perform the task/operation are available/free, step 114. If the service agent/operator is not available/free, or the required resources are not available/free, the grantor also returns a "not granted" or "failed" message to the requester, step 126. On the other hand, if the service agent/operator as well as the required resources are available/free, for the illustrated embodiment, the grantor further determines whether the request is a first request from the workstation, step 116.

For the illustrated embodiment, if the request is a first request from the requesting workstation, the grantor grants the request, and returns a "request granted" message to the requestor, step 124. On the other hand, if the request is not a first request from the requesting workstation, the grantor further determines whether the requesting workstation has previously granted the grantor's workstation's last request to have one or more tasks/operations to be performed on the requestor's workstation for the grantor's workstation using the requestor's workstation's resources, step 118. If the requesting workstation has previously granted the last request of the grantor's workstation, the grantor returns a "granted" or "successful" message to the requester, step 124. On the other hand, if the requesting workstation has not previously granted the last request of the grantor's workstation, for the illustrated embodiment, the grantor generates a generosity measure, step 120, and further determines whether the request should be granted anyway in accordance with the generosity measure, step 122. If the generosity measure denotes that the request should be granted anyway, the grantor returns a "granted" or "successful" message to the requester, step 124. Otherwise, the grantor returns a "not granted" or "failed" message to the requester, step 122.

In one embodiment, the grantor generates the generosity measures by dynamically generating a random number that is between a predetermined range, e.g. 1 to 100, and the grantor grants the request anyway if the generated random number is within a predetermined sub-range of the predetermined range, e.g. between 71–100. The approach may be re-characterized as having the grantor grants the request anyway if the generated random number is greater than a predetermined threshold, i.e. 70 in the example. In other words, for this example, the grantor will nevertheless be generous 30% of the time when it otherwise would have rejected a request.

Underlining the above described approach for the grantor in making its request grant determination is a generous tit-for-tat approach, i.e. "if you cooperate with my request, I'll cooperate with your request; furthermore, I'll be generous at times". The tit-for-tat approach has been studied by evolutionary biologists and believed to be instrumental in engendering cooperation in a civilized society. Thus, it is expected that by implementing a request grant determination approach grounded in the concept of generous tit-for-tat, it is expected that the workstation users will cooperate with each other, instead of undermining each other, thereby making it possible to effectuate distributing computing among a number of networked workstations, in particular, during periods, such as normal business hours, where the workstations are used by the assigned users.

Figure 3:
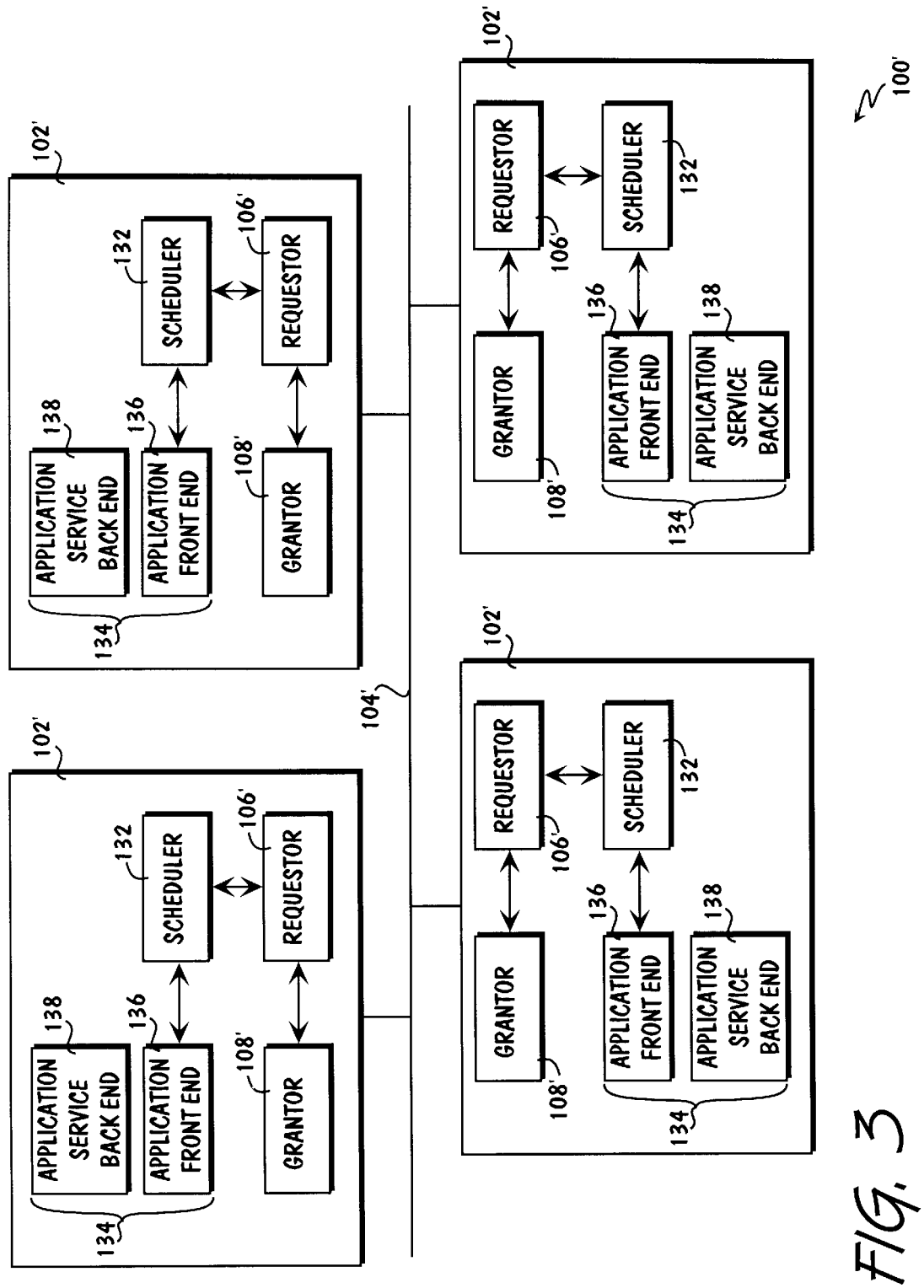
FIG. 3 is a block diagram illustrating one embodiment of a network of workstations incorporated with the teachings of the present invention in further details.
Figure 4:
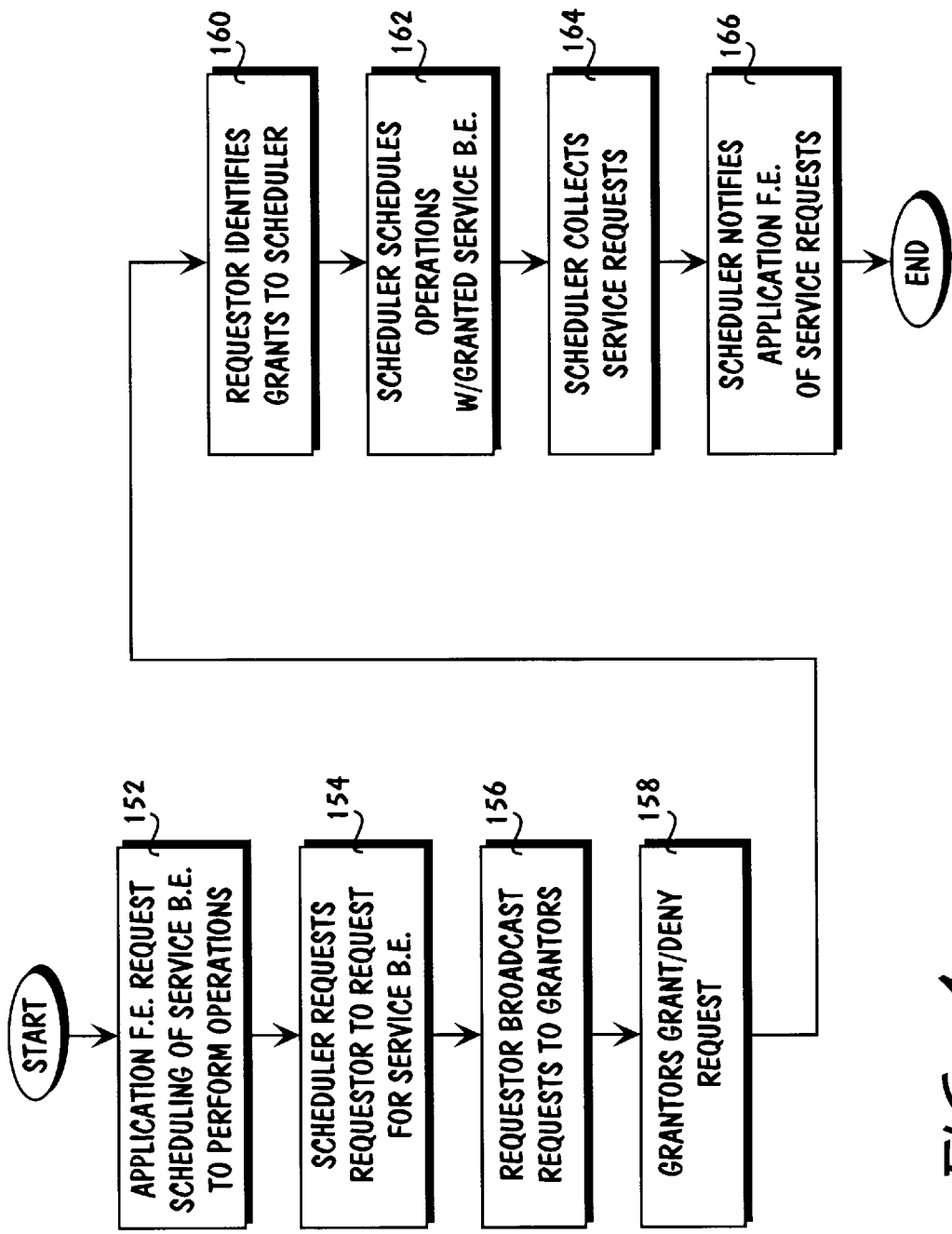
FIG. 4 is a flow diagram illustrating one embodiment of the method steps of the present invention in further details.

Having now described the basic elements of the present invention and their operations, we turn now to FIGS. 3–4, wherein two block diagrams illustrating a particular embodiment of the present invention in further details are shown. As illustrated in FIG. 3, network of workstations 100' includes a number of workstations 102' coupled to each other through network 104'. Again, except for the teachings of the present invention, workstations 102' and network 104' are intended to represent a broad category of these elements known in the art. For the illustrated embodiment, each workstation 102' is incorporated with a software implementation of requestor 106' and grantor 108'. Requestor 106' and grantor 108' perform the fundamental requesting and granting operations, employing the generous tit-for-tat approach described earlier. Additionally, each workstation 102' is equipped with a scheduler 132 and an application 134. Each application 134 is divided into at least two parts, a "front end" portion 136 that interacts with a user and results in multiple tasks/operations that can be independently performed in parallel, and a "back end" portion 138 that operates to service/perform these independent tasks/operations in parallel. Each scheduler 132 is used to schedule and synchronize the independent tasks/operations to be performed by the "back end" portions 138 of application 134 on the various workstations 102'. In one embodiment, "back end" portion 138 includes an "invocation" interface to facilitate scheduler 132 in scheduling the independent tasks/operations to be performed, i.e. particularizing the independent tasks/operations to be performed including input parameter values and so forth. In one embodiment, the tasks/operations to be performed are identified by unique GUIDs. The "invocations" including the provision of the input parameter values may be accomplished in any one of a number of known manners, including but not limited to RPC, DCOM, and TCP/IP sockets. The operations of application 134 and scheduler 132 will be described jointly with references to FIG. 4, in the context of the method of the present invention.

From the descriptions to follow, it will be apparent to those skilled in the art that application 134 may be any application, although it is typically an application that involves a large number of computational intensive tasks/operations. In one embodiment, application 134 is a computer-aided design application for designing mechanical parts, whose operations include a number of computational intensive solid modeling tasks/operations to be performed, such as parametric regeneration of assemblies, Boolean operations on solid models, and so forth. Furthermore, application 134, including the "front end" as well as the "back end" portions, 136 and 138, and scheduler 132 may both be implemented using any one of a number of programming languages, such as C, and/or techniques, such as objected oriented programming, known in the art. In one embodiment, scheduler 132 is implemented as a component of application 134. In another embodiment, requester 106' and grantor 108' are also implemented as components of application 134. In an alternate embodiment, requester 106' and grantor 108' are implemented as components of the operating system instead. In yet another alternate embodiment, scheduler 132 as well as requester 106' and grantor 108' are implemented as components of the operating system.

Referring now to FIG. 4, to effectuate distributed computing among the workstations, an application front end requests a scheduler to schedule a number of independent tasks/operations for performance in parallel by the application back ends on the various workstations, step 152. In response, the scheduler requests the requestor of its own workstation to request the various networked workstations to perform the independent tasks/operations of interest, step 154. The requester in turn broadcast/multicast the requests to the various workstations, step 156.

Upon receipt of the requests (e.g. detecting at the predefined UDP ports), the various grantors then grant or deny the requests, making their grant determinations in accordance with the generous tit-for-tat approach, and informing the requesters as described earlier, step 158. Upon receipt of the various grantors' decisions, the requester notifies the scheduler of the grants received, and maintains a history of the various workstations' grant/denial records, step 160. The scheduler then schedules the various independent task/operations with the various application back ends whose grantors have granted permissions for their usage, including provision of the necessary input parameter values, step 162.

The scheduler then collects the results of the performed tasks/operations from the various task/operation performing application back ends, step 164. For the illustrated embodiment, when all the results are collected, the scheduler notifies the application front end of the results, step 166.

Figure 5:
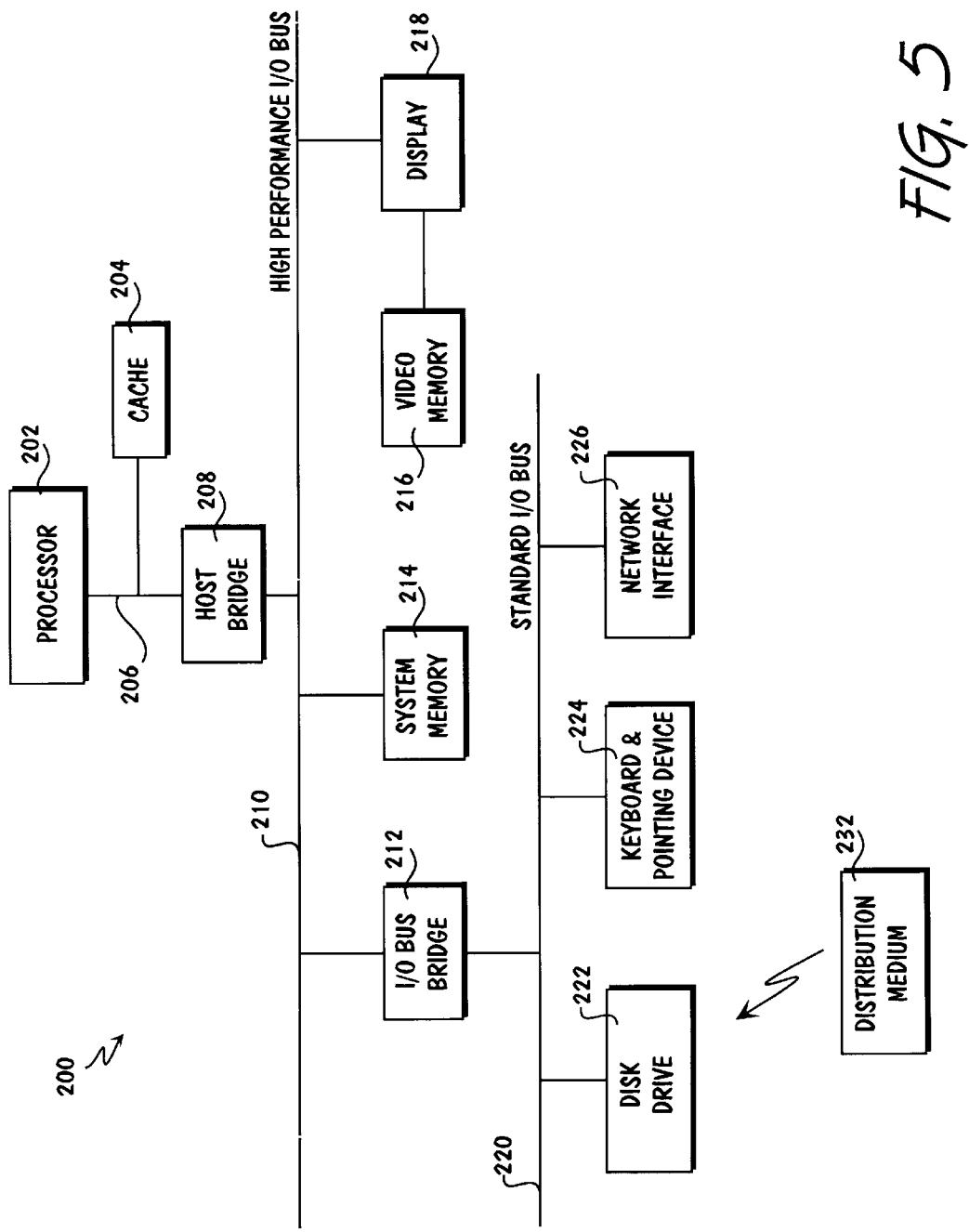
FIG. 5 illustrates one embodiment of a computer system suitable for use to practice the present invention.

FIG. 5 illustrates one embodiment of a workstation suitable for use to practice the present invention. As shown, for the illustrated embodiment, workstation 200 includes processor 202, processor bus 206, high performance I/O bus 210 and standard I/O bus 220. Processor bus 206 and high performance I/O bus 210 are bridged by host bridge 208, whereas I/O buses 210 and 2i2 are bridged by I/O bus bridge 212. Coupled to processor bus 206 is cache 204. Coupled to high performance I/O bus 210 are system memory 214 and video memory 216, against which video display 218 is coupled. Coupled to standard I/O bus 220 are disk drive 222, keyboard and pointing device 224, and network interface 226.

These elements perform their conventional functions known in the art. In particular, disk drive 222 and system memory 224 are used to store permanent and working copies of the application, the scheduler (standalone or integrated), and if applicable, software implementations of the requestor and the grantor (standalone or integrated). The permanent copies may be pre-loaded into disk drive 222 in factory, loaded from distribution medium 232, or down loaded from a remote distribution source (not shown). Distribution medium 232 may be a tape, a CD, a DVD or other storage medium of the like. Hardware implementations of requester and grantor may be embodied as part of network interface 226 or disposed separately on the motherboard (not shown) hosting the bridge and memory elements, 208, 212–216. The constitutions of the enumerated elements are known. Any one of a number of implementations of these elements known in the art may be used to incorporate the teachings of the present invention as described and form workstation 200.

While the present invention has been described using the term workstation, those skilled in the art will appreciate that workstation just one embodiment or form of a computer. The present invention may be practiced in any one of a number networkable embodiments of a computer, including but not limited to e.g. a laptop computer equipped with a network PC card. In addition to the above described expected advantage of cooperation among the workstation users, because of the novel generous tit-for-tat approach included in the request/grant process, interactive users are also discouraged from needlessly performing computational intensive operations, as the generous tit-for-tat approach discourages exploiters, i.e. the interactive users cannot consume others' resources without letting others to use their own resources. Furthermore, those skilled in the art will also appreciate that the invention has the advantage of not requiring a centralized authority or scheduler. The schedulers, requesters and grantors may be implemented as components of an application, thus allowing the present invention to be practiced with conventional operating systems, without requiring support from them; and yet does not preclude these components to be incorporated as part of the operating systems, thereby benefiting multiple applications. In the case of mechanical CAD system applications, the present invention reduces the need for changing the solid modeler to make it thread-safe (in order to share resources), thereby allowing existing geometric modelers such as ACIS to be used.

In general, those skilled in the art will recognize that the present invention is not limited by the details described, instead, the present invention can be practiced with modifications and alterations within the spirit and scope of the appended claims. The description is thus to be regarded as illustrative instead of restrictive on the present invention.

Thus, a method and apparatus for generous tit-for-tat cooperative distributed computing has been described.

What is claimed is:

1. A method for operating a computer system, comprising:
    a) receiving a request from another computer system to allow an operation to be performed for the other computer system using the computer system's resources;
    b) determining whether to grant the request, making the determination at least at times in accordance with the other computer system's prior response(s) to the computer system's prior request(s) to have one or more operations performed for the computer system using the other computer system's resources.

2. The method of claim 1, wherein in (b) the computer system grants the request if the request is not a first request from the other computer system, and the other computer system has previously granted a request of the computer system to perform an operation for the computer system using the other computer system's resources.

3. The method of claim 1, wherein the determination in (b) is further made in accordance with whether the request is a first request from the other computer system independent of the other computer system's prior response(s) to the computer system's prior request(s), the computer system granting the request if the request is a first request from the other computer system.

4. The method of claim 1, wherein the determination in (b) is further made in accordance with a generosity measure, the computer system nevertheless granting the request if the generosity measure denotes that the request should be granted notwithstanding the other computer system's prior response(s) to the computer system's prior request(s) suggesting that the request should not be granted.

5. The method of claim 4, wherein (b) includes dynamically generate the generosity measure by dynamically generating a random number that falls within a predetermined range, and the computer system considers the generosity measure as denoting the other computer system's request is to be granted, if the dynamically generated random number falls within a predetermined sub-range of the predetermined range.

6. The method of claim 1, wherein (b) further includes determining the amount of the computer system's resources required to perform the requested operation for the other computer system, and whether the required amount is available.

7. The method of claim 1, wherein (b) further includes determining if the requested operation is supported by the computer system.

8. The method of claim 1, wherein the method further comprises (c) tracking other computer systems' responses to the computer system's requests to perform operations for the computer system using the other computer systems' responses.

9. The method of claim 1, wherein the method further comprises (c) requesting other computer systems, for the computer system, to perform operations for the computer system using the other computer systems' resources.

10. A computer system comprising a grantor for used to determine for the computer system whether to grant another computer system's request to perform an operation for the other computer system using the computer system's resources, the grantor making the determination at least at times in accordance with the other computer system's prior response(s) to the computer system's prior request(s) to have one or more operations performed for the computer system using the other computer system's resources.

11. The computer system of claim 10, wherein the grantor grants the other computer system's request to perform a operation for the other computer system using the computer system's resources if the other computer system's request is not a first request of the computer system by the other computer system, and the other computer system has previously granted one of the computer system's requests to perform an operation for the computer system using the other computer system's resources.

12. The computer system of claim 10, wherein the grantor grants the other computer system's request independent of the other computer system's prior response(s) to the computer system's request(s) to perform one or more operations for the computer system using the other computer system's resources if the other computer system's request is a first request of the computer system by the other computer system.

13. The computer system of claim 10, wherein the grantor further makes the determination in accordance with whether a generosity measure denotes the other computer system's request should nevertheless be granted notwithstanding the other computer system's prior response(s) to the computer system's prior request(s) denoting that the other computer system's request should not be granted.

14. The computer system of claim 13, wherein the grantor further dynamically generates the generosity measure by dynamically generating a random number that falls within a predetermined range, and the grantor considers the generosity measure as denoting the other computer system's request is to be granted, if the dynamically generated random number falls within a predetermined sub-range of the predetermined range.

15. The computer system of claim 10, wherein the grantor further determines if the requested operation is supported by the computer system.

16. The computer system of claim 10, wherein the grantor further determines the amount of the computer system's resources required to perform the requested operation for the other computer system, and whether the required amount is available.

17. The computer system of claim 10, wherein the computer system further includes a requestor for used to track at least the other computer system's responses to the computer system's requests to perform operations for the computer system using the other computer system's resources.

18. The computer system of claim 10, wherein the computer system further includes a requestor for used to request at least the other computer system, for the computer system, to perform operations for the computer system using the other computer system's resources.

19. A storage medium having stored therein a first plurality of computer instructions, wherein when executed by a first computer system, the executing first plurality of computer instructions operate to determine for the first computer system whether to grant a second computer system's request to perform an operation for the second computer system using the first computer system's resources, and the determination is made at least at times in accordance with the second computer system's prior response(s) to the first computer system's prior request(s) to have one or more operations performed for the first computer system using the second computer system's resources.

20. The storage medium of claim 19, wherein the executing first plurality of computer instructions operate to grant the second computer system's request to perform a operation for the second computer system using the first computer system's resources if the second computer system's request is not a first request of the first computer system by the second computer system, and the second computer system has previously granted a first computer system's request to perform an operation for the first computer system using the second computer system's resources.

21. The storage medium of claim 19, wherein the executing first plurality of computer instructions further operate to grant the second computer system's request independent of the second computer system's prior response(s) to the first computer system's request(s) to perform one or more operations for the first computer system using the second computer system's resources if the second computer system's request is a first request of the first computer system by the second computer system.

22. The storage medium of claim 19, wherein the executing first plurality of computer instructions further operate to make the determination in accordance with whether a generosity measure denotes the second computer system's request should nevertheless be granted notwithstanding the second computer system's prior response(s) to the first computer system's prior request(s) denoting that the second computer system's request should not be granted.

23. The storage medium of claim 22, wherein the executing first plurality of computer instructions further operate to dynamically generate the generosity measure by dynamically generating a random number that falls within a predetermined range, and the executing first plurality of computer instructions consider the generosity measure as denoting the second computer system's request is to be granted, if the dynamically generated random number falls within a predetermined sub-range of the predetermined range.

24. The storage medium of claim 19, wherein the executing first plurality of computer instructions further operate to determine the amount of the first computer system's resources required to perform the requested operation for the second computer system, and whether the required amount is available.

25. The storage medium of claim 19, wherein the executing first plurality of computer instructions further operate to determine if the requested operation is supported by the first computer system.

26. The storage medium of claim 19, wherein the storage medium further having stored therein a second plurality of computer instructions, wherein when executed by the first computer system, the executing second plurality of computer instructions operate to track the second and other computer systems' responses to the first computer system's requests to perform operations for the first computer system using the second and the other computer systems' responses.

27. The storage medium of claim 19, wherein the storage medium further having stored therein a second plurality of computer instructions, wherein when executed by the first computer system, the executing second plurality of computer instructions operate to request the second and other computer systems, for the first computer system, to perform operations for the first computer system using the second and the other computer systems' resources.

28. The storage medium of claim 27, wherein the storage medium further having stored therein a third plurality of computer instructions, wherein when executed by the first computer system, the executing third plurality of computer instructions operate to request the second plurality of computer instructions to request the second and other computer systems, for the first computer system, to perform operations for the first computer system using the second and the other computer systems' resources.

29. The storage medium of claim 28, wherein the executing third plurality of computer instructions further operate to assign operations to the second and the other computer systems having granted the first computer system's request to perform operations for the first computer system using the second and the other computer systems' resources.

30. The storage medium of claim 28, wherein the storage medium further having stored therein a fourth plurality of computer instructions, wherein when executed by the first computer system, the executing fourth plurality of computer instructions operate to identify to the third plurality of computer instructions operations to be performed, and the executing third plurality of computer instructions further operate to subsequently notify the executing fourth plurality of computer instructions of the completion of the identified operations.

31. The storage medium of claim 19, wherein the storage medium further having stored therein a second plurality of computer instructions, wherein when executed by the first computer system, the second plurality of computer instructions operate to perform a plurality of operations for the second and other computer systems.

32. The storage medium of claim 31, wherein the plurality of operations are solid modeling operations.

33. The storage medium of claim 32, wherein the first and second plurality of computer instructions in conjunction with other computer instructions implement a computer-aided design (CAD) software package.

34. The storage medium of claim 19, wherein the first and second plurality of computer instructions and other computer instructions implement an operating system.

* * * * *